United States Patent Office 3,325,284

Patented June 13, 1967

3,325,284
SILVER COMPLEX DIFFUSION TRANSFER PROCESS

André Rott, Antwerp, and Johan Lodewijk Verelst, Deurne-Zuid, Antwerp, Belgium, assignors to Gevaert Photo-Producten N.V., Mortsel, Belgium, a Belgian company No Drawing. Filed Nov. 9, 1962, Ser. No. 236,722
Claims priority, application Netherlands, June 27, 1962, 280,240
7 Claims. (Cl. 96—29)

The present invention relates to a process for the removal of the light-sensitive emulsion layer from the image-receiving layer in a silver halide diffusion transfer process comprising the use of a multilayer material which essentially consists of a support, an image-receiving layer and a light-sensitive silver halide emulsion layer.

Such a multilayer material is described in the British patent specification 654,631 according to which the light-sensitive layer is removed by melting, stripping off or chemical reaction, after formation of the diffusion transfer image.

A similar multilayer material is described in the German patent specification 1,032,091. As a binding agent for silver halide this multilayer material, however, contains carboxylated alkali-soluble and acid-unsoluble cellulose derivatives. During the treatment of such a material in an alkaline solution for the formation of a diffusion transfer image, the emulsion layer absorbs alkali indeed, but does not dissolve on account of the high salt concentration of the processing bath. In order to remove the light-sensitive emulsion layer, so that the diffusion transfer image becomes visible on the support, the alkaline multilayer material is brought into pure water whereby the light-sensitive layer dissolves.

All these processes for the removal of the light-sensitive emulsion layer however, are subject to considerable inconvenience such as imperfect removal of the light-sensitive emulsion layer, the necessity for supplementary treatment and a total loss of the negative image, the positive copy of the original thus obtained, moreover, still being wet.

It now has been found that in a multilayer material to be used in the silver complex diffusion transfer process, which essentially and in the indicated sequence comprises a support, an image-receiving layer and a light-sensitive silver halide emulsion layer, after image-wise exposure and development and after the at least partial diffusion of the undeveloped and complexed silver halide to the image-receiving layer, the removal of the emulsion layer from the image-receiving layer can be performed in a simple and perfect way without destruction of the negative image, by stripping off the emulsion layer by means of an auxiliary sheet which is previously pressed against it. This auxiliary sheet is a flexible material so constructed or provided with a special adhesive layer that the light-sensitive emulsion layer adheres more strongly to it than to the image-receiving layer. The auxiliary sheet may, moreover contain substances which are required for obtaining an image or an improved image.

According to the present invention one may proceed as follows: a multilayer material comprising the aforesaid layers is image-wise exposed. The auxiliary sheet and the imagewise exposed multilayer material are simultaneously passed through an apparatus commonly used in the diffusion transfer process, so that on leaving the apparatus these materials are pressed together. After a contact time, generally comprised between 10 sec and 1 min., the auxiliary sheet together with the emulsion layer containing the negative image adhering thereon are stripped off, whereby a positive and a negative image of the original are obtained in a very simple manner indeed.

This is only one of the many embodiments of the process according to the present invention. It is possible to obtain immediately a dry copy, either the negative or the positive, by moistening the exposed multilayer material or the auxiliary sheet with the processing liquid only, and keeping the wet and the dry material in contact for some time.

A multilayer material which is suitable for the use in a process according to the present invention comprises a support e.g. of baryta coated paper, pigmented paper, plastic material, fabrics or metal which are coated with an image-receiving or nuclei-containing layer. The image-receiving layer consists mainly of a dispersion of developing nuclei in gelatin or other binding agents such as those described in the British patent specification 687,751, the French patent specifications 1,268,160 and 1,274,680. When the binding agent of the image-receiving layer contains plastic materials such as those described in the three latter patent specifications, it is possible after the transfer onto the auxiliary sheet of the emulsion layer containing the negative image, to use this whole in order to obtain several copies of the original. Suitable developing nuclei are: the sulfides of heavy metals such as antimony, bismuth, cadmium, cobalt, lead, nickel and also selenides, polysulfides, polyselenides, mercaptans, stannous halides, heavy metals, preferably the noble metals their salts and fogged silver halides. The image-receiving layer may also contain developing agents for such nuclei, such as hydroquinone, methyl-p-aminophenolsulfate, aminophenol and 3-pyrazolidone developing agents, or mixtures of developing agents, such as the mixture of a hydroquinone and a 3-pyrazolidone as described in the Belgian patent specification 611,637. The image-receiving layer which may be hardened, may also contain other ingredients such as black-toning agents, alkali, a complexing agent for silver halide etc.

The light-sensitive emulsion layer is coated onto the image-receiving layer. Any light-sensitive silver halide emulsion can be used, provided the silver salt(s) is (are) capable of sufficiently rapid development during the diffusion transfer process and the non-exposed silver salt(s) is (are) sufficiently rapidly complexed. Some ingredients such as developing substances e.g. those of the 3-pyrazolidone series plasticizers, black-toning agents and others may also be incorporated in this light-sensitive emulsion layer.

Usually one or more intermediate or separating layers are applied between the light-sensitive and the image-receiving layer such as described in the French patent specifications 1,304,279 and 1,304,280. With a separating layer, as described in these two patent specifications, it is possible to allow the multilayer material and the auxiliary sheet after the diffusion transfer to stay in contact till complete dryness and only then to separate the negative from the positive copy. In some cases these layers also may contain some ingredients which commonly are incorporated in the light-sensitive or in the image-receiving layer. The multilayer material suitable for the use in the process according to the present invention may further contain other intermediate or auxiliary layers according to the special requirements this material must meet. In these layers, which are not strictly required, ingredients may be incorporated for the formation of an improved diffusion transfer image.

The auxiliary layer by means of which the light-sensitive layer containing a negative image of the original is stripped off from the image-receiving layer, may be such a flexible material to which the light-sensitive emulsion layer adheres more strongly than to the image-receiving layer. This auxiliary layer also may consist of a support e.g. paper, baryta-coated paper or other pigmented paper, plastic material, fabrics or metal, provided with an adhesive layer. As binding agent for this adhesive layer may be used e.g. gelatin, other water-permeable or synthetic polymers or mixtures of these binding agents. Intermediate layers and auxiliary layers may also be applied between the support and the adhesive layer of the auxiliary sheets. Some ingredients which are necessary or important in the diffusion transfer process such as developing substances, preservatives for these developing substances, alkali, a complexing agent for silver halide, black-toning agents, e.g. may also be incorporated into the support and/or into another layer such as the adhesive layer of the auxiliary sheet. The incorporation of some of these ingredients into the auxiliary layer gives a much better conservation time of the processing bath, since the latter tends to be rapidly exhausted by the consumation of the active ingredients incorporated therein. By providing a suitable disposition of the ingredients used in the diffusion transfer process, it is possible to use a simple alkaline solution and even pure water as a processing liquid such as described in the Belgian patent specification 612,103.

More particulars concerning the exposing and developing apparatus, the silver halide diffusion transfer process in general and suitable material for that process are described in "Progress in Photography," vol. I, 1940–1950, pp. 76, 77 and 140; vol. II, 1951–1954, pp. 156–157; vol. III, 1955–1958, pp. 24–36 and in the patent specifications mentioned therein.

The following examples illustrate the invention.

EXAMPLE 1

(1) *Composition of the multilayer material in the indicated sequence*

A. A cellulose triacetate support of 140μ thickness.

B. A subbing layer applied from the following solution:

| | | |
|---|---|---|
| Gelatin | g. | 10 |
| Water | cm.³ | 163 |
| Ethanol | cm.³ | 250 |
| Acetone | cm.³ | 550 |
| 10% aqueous nitric acid (d.=1,4.) | cm.³ | 4 |

This solution is applied in such a way that 1 l. thereof covers 48 sq. m.

| | | |
|---|---|---|
| 4% aqueous methyl-p-aminophenolsulfate | cm.³ | 4 |
| 4% aqueous potassium metabisulfite | cm.³ | 1 |
| water to 100 cm.³. | | |

The composition is applied in such a way that 1 kg. thereof covers 8 sq. m.

(3) *Composition of the processing liquid*

| | | |
|---|---|---|
| Sodium hydroxide | g. | 75 |
| Water | cm.³ | 1000 |

(4) *Treatment*

The light-sensitive multilayer material is image-wise exposed and then together with the auxiliary sheet passed through a diffusion transfer developing apparatus containing the aforesaid processing liquid. After the multilayer material and the auxiliary sheet leave the apparatus, they are kept in close contact for 1 min. Then the two materials are separated from each other whereby the emulsion layer bearing the negative image strongly adheres to the auxiliary sheet.

EXAMPLE 2

(1) *Composition of the multilayer material in the indicated sequence*

A. A cellulose triacetate support of 140μ thickness.

B. An adhesive layer applied from the following solution:

C. An image-receiving layer coated from the following suspension:

| | Cm.³ |
|---|---|
| 10% aqueous gelatin | 50 |
| 2% aqueous colloidal silver | 5 |
| 4% aqueous saponin | 1 |
| 4% aqueous formaldehyde | 1 |
| Water to 100 cm.³. | |

This suspension is coated in such a way that 1 kg. thereof covers 10 sq. m.

D. A separating layer applied from a 1% aqueous solution of hydroxyethyl starch, in such a way that 1 kg. thereof covers 25 sq. m.

E. A highly sensitive gelatin silver bromoiodide emulsion layer applied in such a way that 1 kg. of this emulsion covers 12 sq. m. For preparing 1 l. of this emulsion 50 g. of gelatin and 55 g. of silver nitrate have been used.

(2) *Composition of the auxiliary sheet in the indicated sequence*

A. A baryta-coated paper support of 140 g./sq. m.

B. An adhesive layer applied from the following composition:

| | | |
|---|---|---|
| Gelatin | g. | 8 |
| Sodium thiosulfate, 5 aq. | g. | 2.4 |
| 4% aqueous saponin | cm.³ | 0.5 |
| 20% solution of hydroquinone in a mixture of ethanol and water (1:1) | cm.³ | 8 |
| Gelatin | g. | 10 |
| Water | cm.³ | 163 |
| Ethanol | cm.³ | 250 |
| Acetone | cm.³ | 550 |
| 10% aqueous nitric acid (d.=1.4.) | cm.³ | 4 |

This solution is applied in such a way that 1 l. thereof covers 50 sq. m.

C. An image-receiving layer coated from the following suspension:

| | Cm.³ |
|---|---|
| 10% aqueous gelatin | 50 |
| 2% aqueous colloidal silver | 5 |
| 4% aqueous saponin | 1 |
| 4% aqueous formaldehyde | 1 |
| 1% aqueous strontium chloride | 3 |
| Water to 100 cm.³. | |

This suspension is coated in such a way that 1 kg. thereof covers 10 sq. m.

D. A separating layer coated from a 3% aqueous sodium alginate solution in such a way that 1 kg. thereof covers 25 sq. m.

E. A light-sensitive emulsion layer coated from the following suspension:

| | | |
|---|---|---|
| Emulsion as described in Example 1 under 1E | g. | 100 |
| 4% aqueous 1-phenyl-3-pyrazolidone | cm.³ | 4 |

This suspension is coated in such a way that 1 kg. thereof covers 12 sq. m.

(2) *Composition of the transfer material in the indicated sequence*

A. A cellulose triacetate support of 140μ thickness.

B. A subbing layer as described in Example 1 under 1B.

C. An adhesive layer applied from the following composition:

| | | |
|---|---|---|
| Gelatin | g. | 8 |
| 4% aqueous saponin | cm.³ | 1.2 |
| 20% solution of hydroquinone in a mixture of ethanol and water (1:1) | cm.³ | 8 |
| Water to 100 cm.³. | | |

This composition is applied in such a way that 1 kg. thereof covers 8 sq. m.

(3) *Composition of the processing bath*

| | | |
|---|---|---|
| Sodium hydroxide | g | 75 |
| Sodium thiosulphate, 5 aq. | g | 60 |
| Water | $cm.^3$ | 1000 |

(4) *The treatment is performed as in Example 1*

We claim:

1. A process for forming images according to the silver complex diffusion transfer process comprising imagewise exposing a photographic multilayer material comprising in the indicated sequence a support, an image-receiving layer and a silver halide emulsion layer, bringing said material into contact with an auxiliary flexible sheet in the presence of an aqueous treating liquid and in the presence of ingredients for carrying out said diffusion transfer process, said ingredients comprising a developing agent, a silver halide complexing agent, and an alkaline compound, at least one of said ingredients being incorporated in said auxiliary flexible sheet, said auxiliary flexible sheet having a greater adherence for said emulsion layer than does said emulsion layer for the remainder of said multilayer material, and stripping off said auxiliary flexible sheet with the emulsion layer in substantial entirety remaining adherent thereon.

2. The process of claim 1, wherein a separating layer is situated between the image-receiving layer and the light-sensitive silver halide emulsion layer of said multi-layer material.

3. The process of claim 1, wherein the auxiliary sheet has incorporated therein said developing agent together with a preservative for said developing agent.

4. The process of claim 1, wherein said aqueous medium contains at least one other of said processing ingredients.

5. The process of claim 1, wherein said auxiliary sheet has said silver halide complexing agent incorporated therein.

6. The process of claim 2, wherein said separating layer comprises essentially hydroxyethyl starch.

7. The process of claim 1, wherein said auxiliary sheet comprises a support and a firmly adhesive surface layer containing a hydrophilic colloidal binding agent having strong adherence for said emulsion layer.

References Cited

UNITED STATES PATENTS

| | | | |
|---|---|---|---|
| 3,003,875 | 10/1961 | Ryan | 96—29 X |
| 3,091,530 | 5/1963 | Green et al. | 96—29 |
| 3,108,001 | 10/1963 | Green | 96—29 |

NORMAN G. TORCHIN, *Primary Examiner.*

J. RAUBITSCHEK, *Assistant Examiner.*